United States Patent

Hung et al.

[11] Patent Number: 5,866,656
[45] Date of Patent: Feb. 2, 1999

[54] POLYURETHANE HOTMELT ADHESIVES WITH REACTIVE ACRYLIC COPOLYMERS

[75] Inventors: Ju-Ming Hung, Yardley, Pa.; James W. Nowicki, Hopewell, N.J.; George A. Hespe, Belle Mead, N.J.; Paul P. Puletti, Pittstown, N.J.

[73] Assignee: National Starch and Chemical Investment Holding Corporation, Wilmington, Del.

[21] Appl. No.: 937,242

[22] Filed: Sep. 8, 1997

Related U.S. Application Data

[63] Continuation of Ser. No. 744,896, Nov. 8, 1996, abandoned, which is a continuation of Ser. No. 483,133, Jun. 7, 1995, abandoned.

[51] Int. Cl.⁶ .............................. C08J 3/00; C08K 3/00; C08L 75/00; C08F 8/30
[52] U.S. Cl. .................. 525/123; 524/507; 525/127; 525/455
[58] Field of Search ............... 524/507; 525/123, 525/127, 455

[56] References Cited

U.S. PATENT DOCUMENTS

| | | | |
|---|---|---|---|
| 3,532,652 | 10/1970 | Zang et al. | 260/23 |
| 3,931,077 | 1/1976 | Uchigaki et al. | 260/26 |
| 4,214,061 | 7/1980 | Lee | 525/455 |
| 4,585,819 | 4/1986 | Reischle et al. | 524/196 |
| 4,618,651 | 10/1986 | Gilch et al. | 525/130 |
| 4,636,546 | 1/1987 | Chao | 524/507 |
| 4,775,719 | 10/1988 | Markevka et al. | 525/125 |
| 4,808,255 | 2/1989 | Markevka et al. | 156/307.3 |
| 4,891,269 | 1/1990 | Markevka et al. | 428/423 |
| 5,021,507 | 6/1991 | Stanley et al. | 525/127 |
| 5,349,040 | 9/1994 | Trinks et al. | 528/75 |

OTHER PUBLICATIONS

Ex parte Grasselli et al., 231 VSPQ 293–295.

*Primary Examiner*—Patrick D. Niland
*Attorney, Agent, or Firm*—Ellen T. Dec

[57] ABSTRACT

A solvent-free one-part hot melt polyurethane adhesive or sealant composition which is solid at room temperature comprising 10 to 70% by weight of a urethane prepolymer having an isocyanate content of 0.25 to 15% and an isocyanate index greater than 1 and 30 to 90% by weight of an ethylenically unsaturated polymer having a number average molecular weight of 4,000 to 15,000 as determined by Gel Permeation Chromatography using a PL Gel,Mixed 10 micron column, a Shimadzu Model RID 6A Detector with a tetrahydrofuran carrier solvent at a flow rate of 1 milliliter per minute, the polymer containing sufficient hydroxyl functionality to provide an OH number of 5 to 15.

11 Claims, No Drawings

POLYURETHANE HOTMELT ADHESIVES WITH REACTIVE ACRYLIC COPOLYMERS

This application is a continuation of application Ser. No. 08/744,896, filed Nov. 8, 1996 now abandoned which is a continuation of application Ser. No. 08/483,133, filed Jun. 7, 1995 now abandoned.

BACKGROUND OF THE INVENTION

Hot melt adhesives are 100% solid materials which do not contain or require any solvents and are solid at room temperature but, on application of heat, melt to a liquid or fluid state in which form they are applied to a substrate. On cooling, the adhesive regains its solid form and gains its cohesive strength. Hot melt adhesives which are applied in molten form, cool to solidify and subsequently cure by a chemical crosslinking reaction have been prepared using specific materials such as polyurethanes.

Reactive hot melts are one-component, 100% solid, solvent-free urethane prepolymers. Unlike conventional hot melts that can be repeatedly heated from solid state and flowed to a liquid form, the reactive hot melt behaves as a thermoset and goes through an irreversible chemical reaction once dispensed in the presence of ambient moisture. The reactive hot melts are isocyanate terminated prepolymers that react with surface or ambient moisture in order to chain-extend, forming a new polyurethane polymer which offers performance superior to that obtained with conventional hot melt.

It is known from U.S. Pat. No. 5,021,507 to Stanley et al. that the incorporation into otherwise conventional polyurethane hot melt adhesives of low molecular weight polymers formed from ethylenically unsaturated monomers containing no reactive hydrogen provides an improvement with respect to cohesive and adhesive strength and assists in forming bonds with some of the more difficult to adhere substrates. In order to incorporate the low molecular weight polymer into the polyurethane, it is possible to polymerize the respective monomers within the urethane prepolymer or, optionally, to add an already polymerized low molecular weight polymer into the urethane prepolymer. Typical monomers useful include acrylic monomers such as the C1 to C12 esters of acrylic or methacrylic acid as well as ethylenically unsaturated monomers containing moisture reactive functional groups such as silane or reactive isocyanate. Typical low molecular weight polymers are represented by Elvacite 2013, a 64% butylmethacrylate/36% methylmethacrylate copolymer having an I.V. of 0.2.

While the class of adhesives described in the aforementioned patent has substantially improved properties for most applications, the fact that the low molecular weight polymer is merely blended into, and not chemically bound, within the urethane still creates problems in areas where high heat and/or solvent resistance is required such as for automotive adhesive and sealant applications. Moreover, the range of acrylic monomers useful is somewhat limited in terms of Tg. Thus the higher Tg, more polar acrylics are found to be more compatible with the urethanes while the lower Tg, non-polar acrylics could not be as readily incorporated into the system. There is, however, a need for adhesives containing these lower Tg materials since they will provide for a more elastomeric adhesive and may improve the adhesion to certain metal substrates as well as provide for longer open time or bond range.

SUMMARY OF THE INVENTION

We have now found that a higher degree of heat and solvent resistance as well as better metal adhesion and open time may be achieved by incorporating within the acrylic polymer sufficient hydroxyl moieties to provide a final polymer having a hydroxyl number of 5 to 15. This may be done by blending an effective amount of hydroxyl containing polymerizable monomers with the ethylenically unsaturated monomers prior to polymerization or by adding preformed low molecular weight polymers having the required hydroxyl number range. The hydroxyl containing polymer, when combined with the urethane prepolymer, reacts with the isocyanate to chemically bond the acrylic moiety within the one-part adhesive or sealant composition.

DETAILED DESCRIPTION OF THE PREFERRED EMBODIMENTS

The urethane prepolymers are those conventionally used in the production of polyurethane hot melt adhesive compositions. Most commonly, the prepolymer is prepared by the condensation polymerization of a polyisocyanate with a polyol, most preferably the polymerization of a diisocyanate with a diol. The polyols used include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol.

In addition, the urethane prepolymers may be prepared by the reaction of a polyisocyanate with a polyamino or a polymercapto-containing compound such as diamino polypropylene glycol or diamino polyethylene glycol or polythioethers such as the condensation products of thiodiglycol either alone or in combination with other glycols such as ethylene glycol, 1,2-propylene glycol or with other polyhydroxy compounds disclosed above. In accordance with one embodiment of the invention, the hydroxyl containing acrylic polymer may function as the polyol component, in which case, no additional polyol need be added to the reaction.

Further, small amounts of low molecular weight dihydroxy, diamino, or amino hydroxy compounds may be used such as saturated and unsaturated glycols, e.g., ethylene glycol or condensates thereof such as diethylene glycol, triethylene glycol, and the like; ethylene diamine, hexamethylene diamine and the like; ethanolamine, propanolamine, N-methyldiethanolamine and the like.

Any suitable organic polyisocyanate may be used such as, for example, ethylene diisocyanate; ethylidene diisocyanate; propylene diisocyanate; butylene diisocyanate; hexamethylene diisocyanate; toluene diisocyanate; cyclopentylene-1,3,-diisocyanate; 3-isocyanatomethyl-3,5,5-trimethylcyclohexyl isocyanate; 3-isocyanatomethyl-3,5,5-trimethylcyclohexyl isocyanate cyanurate; cyclohexylene-1,4-diisocyanate; cyclohexylene-1,2-diisocyanate; 4,4'-diphenylmethanediisocyanate; 2,2-diphenylpropane-4,4'-diisocyanate, p-phenylene diisocyanate; m-phenylene diisocyanate; xylylene diisocyanate; 1,4-naphthylene diisocyanate, 1,5-naphthylenediisocyanate; diphenyl-4,4'-diisocyanate; azobenzene-4,4'-diisocyanate; diphenylsulphone-4,4'-diisocyanate; dichlorohexamethylene diisocyanate; furfurylidene diisocyanate; 1-chlorobenzene-2,4-diisocyanate; 4,4',4"-triisocyanatotriphenylmethane; 1,3,5-triisocyanatobenzene; 2,4,6-triisocyanato-toluene and 4,4'-dimethyldiphenylmethane-2,2',5,5-tetraisocyanate, and the like.

The polyisocyanate and polyol, polyamino or polymercapto components are combined in proportions so as to yield a urethane prepolymer characterized by an isocyanate content (i.e. % NCO) of from about 0.25 to about 15%, preferably to about 10%, and most preferably from 1.0 to 5%. In addition, the ratio of isocyanate equivalents to hydroxyl, amino or mercapto equivalents (known as the isocyanate index) should be greater than 1, preferably no more than about 3. By maintaining the low isocyanate index, we are able to reduce the level of free isocyanate monomer content in the final hot melt adhesive composition to less than about 4%. It will be recognized that the presence of higher levels of free isocyanate has a detrimental effect on a hot melt formulation since it causes toxic fumes to be released when the adhesive is heated to application temperature. The higher levels of free isocyanate may also cause reduction in viscosity and poorer initial bond strength of the adhesive. The precise amount of the polyisocyanate used in the polymerization will depend on the equivalent weight and amount of the non-isocyanate components, and the particular polyisocyanate employed. In general, the amount of the polyisocyanate needed to achieve the isocyanate content will vary from about 5 to about 35% of the final prepolymer.

Virtually any ethylenically unsaturated monomer containing hydroxyl functionality greater than one may be utilized in the compositions of the present invention. Most commonly employed are hydroxyl substituted C1 to C12 esters of acrylic and methacrylic acids including, but not limited to hydroxyl substituted methyl acrylate, ethyl acrylate, n-butyl acrylate, 2-ethylhexyl acrylate, isobutyl acrylate, n-propyl or iso-propyl acrylate or the corresponding methacrylates. Mixtures of compatible (meth)acrylate monomers may also be used. Additional monomers that may be used include the hydroxyl substituted vinyl esters (vinyl acetate and vinyl propionate), vinyl ethers, fumarates, maleates, styrene, acrylonitrile, etc. as well as comonomers thereof.

If used as monomers, these monomers are blended with other copolymerizable comonomers as formulated so as to have a wide range of Tg values, as between about −48° and 105° C., preferably 15° to 85° C. Suitable comonomers include the C1 to C12 esters of acrylic and methacrylic acids including, but not limited to methyl acrylate, ethyl acrylate, n-butyl acrylate, isobutyl acrylate, 2-ethylhexyl acrylate, n-propyl or iso-propyl acrylate or the corresponding methacrylates. Mixtures of compatible (meth)acrylate monomers may also be used. Additional monomers that may be used include the vinyl esters (vinyl acetate and vinyl propionate), vinyl ethers, fumarates, maleates, styrene, acrylonitrile, ethylene, etc. as well as comonomers thereof.

The hydroxyl containing monomers may be the same or different from the monomers used in the remainder of the acrylic polymerization. The particular monomers selected will depend, in large part, upon the end use for which the adhesives are intended. Thus, adhesives to be used in pressure sensitive applications or in applications wherein adhesion to metal is required will be selected to obtain a lower Tg polymer than may be desired in non-pressure sensitive applications or those involving more easily bonded substrates.

When the adhesive is to be prepared utilizing monomeric materials, the respective monomers may be added to the polyols and polymerized therein prior to formation of the prepolymer or may be added to the already formed prepolymer and the acrylic polymerization subsequently performed. In the case of polyamino or polymercapto containing prepolymers, in-situ vinylic polymerization must be performed only in the pre-formed prepolymer.

The hydroxyl containing ethylenically unsaturated monomer is polymerized using conventional free radical polymerization procedures to a relatively low molecular weight. For purposes of clarification herein, by "low molecular weight" we mean number average molecular weights in the range of approximately 4,000 to 15,000, preferably to 12,000. Molecular weight distribution is characterized by Gel Permeation Chromatography using a PL Gel,Mixed 10 micron column, a Shimadzu Model RID 6A Detector with a tetrahydrofuran carrier solvent at a flow rate of 1 milliliter per minute. The low molecular weight is obtained by careful monitoring and controlling the reaction conditions and, generally, by carrying out the reaction in the presence of a chain transfer agent such as dodecyl mercaptan. Subsequent to the polymerization of the ethylenically unsaturated monomer(s), the polyisocyanate and any additional ingredients required for the urethane prepolymer forming reaction are added and that reaction is carried out using conventional condensation polymerization procedures. In this manner, the resultant isocyanate terminated urethane prepolymer forms the reactive curing hot melt adhesive described above which contains about 10 to 70% of the urethane prepolymer and 30 to 90% of the low molecular weight hydroxyl containing polymer.

It is also possible to polymerize the low molecular weight polymer in the presence of the already formed isocyanate terminated urethane prepolymer. This method has the drawback of subjecting the prepolymer to unnecessary heating during the acrylic polymerization, heating that might result in branching, viscosity increase, depletion of needed isocyanate groups and possible gellation. Although these disadvantages are subject to control, more stringent control of conditions are required as compared to polymerization in the non-isocyanate functional urethane components. When the reaction is run in the polyol or other non-isocyanate containing component, there is also the advantage of lower reaction viscosities and reduced exposure to isocyanate vapors because of the lesser amount of heating required.

Optionally, the hydroxyl containing functionality may be introduced into the adhesive in the form of pre-polymerized low molecular weight hydroxyl containing polymers. In the latter case, typical polymers include hydroxyl substituted butyl acrylate, hydroxylated butyl acrylate/methyl methacrylate copolymers, hydroxylated ethyl acrylate/methyl methacrylate copolymers, and the like, the polymers having a number average molecular weight of 4,000 to 12,000 and a hydroxyl number of 5 to 15. If used in the form of low molecular weight polymers, the polymers may be blended with the polyol prior to reaction thereof with the isocyanate or they may be added directly to the isocyanate terminated prepolymer.

It has been determined that the advantages of the present invention can be obtained by utilizing anywhere between 30 and 90% by weight of the hydroxylated polymer in the adhesive composition with correspondingly 70 to 10% by weight of the urethane prepolymer.

While the adhesives may be used directly as described above, if desired the adhesives of the present invention may also be formulated with conventional additives such as plasticizers, compatible tackifiers, catalysts, fillers, antioxidants, pigments, mercapto/silane adhesion promotors, stabilizers and the like.

The resulting hot melt adhesive compositions, as described herein above, are typically applied at temperatures of from about 120° F. and a corresponding melt viscosity of from about 3,000 to 70,000 centipoises.

This invention can be further illustrated by the following examples of preferred embodiments thereof, although it will be understood that these examples are included merely for purposes of illustration and are not intended to limit the scope of the invention unless otherwise specifically indicated.

In the Examples the following testing procedures were utilized:

TEST PROCEDURES

| Molecular Weight - Condition of GPC Characterization | |
|---|---|
| Model: | Water Model 712 Wisp Autosampler |
| Column: | PL Gel, Mixed 10 u |
| Detector: | Shimadzu Model RID 6A |
| Injection Volume: | 50 UL |
| Flow Rate: | 1 ML/MIN |
| Temperature: | 25° C. |
| Solvent: | THF |
| Calibration: | Polystyrene Standard |
| Sample Conc.: | 10 MG/4 ML |

Open Time (Bond Range): Coated 5 mil adhesive on the flat surface and measured the number of minutes during which the adhesive surface remained tacky.

Dynamic Peel: Coated 5 mil thickness adhesive on a hot (250° F.) glass surface. Then quickly placed a vinyl strip (325 mm×16 mm×0.007 inch) in the center of adhesive film. A 103 gram weight was placed onto the hole-punched end of the vinyl strip. Under ambient conditions the temperature of the bonded composite falls. At one minute intervals, the temperature is recorded as is the length of dislocatation of the ruptured bond.

EXAMPLE I

The following example illustrates the general procedure for the preparation of the adhesives described herein. The specific adhesive described is identified in Table I as Adhesive A. Similar procedures were used to prepare the other adhesives varying either the particular hydroxyl containing polymer utilized or the relative amounts thereof.

The polymer used in Adhesive A is a 57% butylacrylate/41% methylmethacrylate/2% 2-hydroxy ethylhexyl acrylate polymer having a number average molecular weight of 8,450 and a hydroxyl number of 10.

The polymer was vacuum dried in a desiccator for 24 hours immediately prior to use herein to eliminate the possibility of entrapped moisture.

| Ingredients: | |
|---|---|
| Polypropylene Glycol (2000 Mol. wt.) | 880.0 gm |
| 1,6-hexanediol neopentyl glycol adipate (3500 Mol. wt.) | 368.0 |
| Hydroxyl containing polymer | 1500.0 |
| Methylene bisphenyl diisocyanate | 380.0 |
| Degassing Aid (Modaflow) | 3.0 |

The polyols, degassing aid and the hydroxyl containing polymer were added to the vessel and heated to 100° C. until the polymer was dissolved. At that point the methylene bisphenyl diisocyanate was added, and the reaction was held at 100° C. for 3 hours. After the 3 hours at 100° C. the reaction was poured hot from the vessel.

The samples described in Table 1 were all prepared as above using 48% by weight of the particular hydroxyl containing acrylic polymer. For Control purposes, a hot melt adhesive was prepared according to the teachings of Example 23 of U.S. Pat. No. 5,021,507 to Stanley et al.

TABLE 1

| | Analysis | | | | | | Peel Rate (mm/min) | Bond Range |
|---|---|---|---|---|---|---|---|---|
| Sample | Mn | OH# | Tg (°C.)(4) | % NCO | Stability % | Visc. (cps) | at 35° C. | (min) |
| Control | NA | NA | NA | 1.8 | 4.2 | 5,400 | 80 | 10 |
| A | 9,400 | 10 | 15.9 | 2.0 | 14.7 | 8,450 | 70 | 35 |
| B | 18,600 | 10 | 15.1 | GEL | GEL | GEL | GEL | GEL |
| C | 11,000 | 5 | 15.9 | 1.6 | 20.0 | 3,600 | <20 | 30 |
| D | 9,670 | 15 | 15.2 | 2.0 | 18.0 | 14,380 | <20 | 30 |
| E | 9,660 | 20 | 16.2 | GEL | GEL | GEL | GEL | GEL |
| F | 9,500 | 10 | 27.3 | 1.7 | 32.0 | 38,000 | <20 | 15 |
| G | 17,800 | 10 | 31.7 | GEL | GEL | GEL | GEL | GEL |
| H | 9,930 | 10 | 38.8 | 1.8 | 28.0 | 87,500 | <20 | 10 |
| I | 6,020 | 12 | 15.9 | 2.0 | 3.0 | 5,650 | 70 | 35 |
| J | 5,710 | 10 | 27.3 | 1.8 | 3.3 | 9,800 | <20 | 15 |

A: 57 methyl methacrylate/41 butyl acrylate/2 2-hydroxy ethylhexyl acrylate
B: 57 methyl methacrylate/41 butyl acrylate/2 2-hydroxy ethylhexyl acrylate
C: 57 methyl methacrylate/42 butyl acrylate/1 2-hydroxy ethylhexyl acrylate
D: 56 methyl methacrylate/41 butyl acrylate/3 2-hydroxy ethylhexyl acrylate
E: 56 methyl methacrylate/40 butyl acrylate/4 2-hydroxy ethylhexyl acrylate
F: 50 methyl methacrylate/48 ethyl acrylate/2 2-hydroxy ethylhexyl acrylate
G: 50 methyl methacrylate/48 ethyl acrylate/2 2-hydroxy ethylhexyl acrylate
H: 66 methyl methacrylate/32 ethyl acrylate/2 2-hydroxy ethylhexyl acrylate
I: 57 methyl methacrylate/41 butyl acrylate/2 2-hydroxy ethylhexyl acrylate
J: 50 methyl methacrylate/48 butyl acrylate/2 2-hydroxy ethylhexyl acrylate The results presented in Table 1 illustrate the effect of a number of variables on the adhesive compositions disclosed herein. Thus, it will be recognized that the higher hydroxyl numbers provide a higer cross-linking density and consequent improvement in strength (i.e., lower peel rates); however, as the hydroxyl number increases above about 15, problems are encountered with gelling of the product. The higher molecular weight polymers also provided increase in strength properties up to about the 12,000 range at which point gelling was also a problem. It will also be recognized from the results presented herein that the use of polymers having higher Tg values will provide for an adhesive having higher peel strength; however, lower Tg containing adhesives may be more suitable for certain applications.

EXAMPLE II

Another series of adhesives were prepared as in Example I using polymers identified as I and J but varying the amounts of the hydroxyl containing polymer utilized. The formulations and testing results appear in Table 2. In Table 2, the peel test values represent are shown at the temperatures as noted.

| Sample | % Amount Polymer | % NCo | Visc. | Peel | OT |
|---|---|---|---|---|---|
| I | 25 | 2.0 | 2,265 | 1350* | 40 |
| I | 39 | 2.1 | 3,500 | 540** | N/T |
| I | 48 | 2.0 | 5,650 | 70*** | 35 |
| J | 25 | 2.0 | 3,250 | 420* | 20 |
| J | 39 | 2.2 | 4,400 | 80** | N/T |
| J | 48 | 1.8 | 9,800 | <20*** | 15 |

*31° C.; 38° C.; *35° C.

In all cases, the hydroxyl containing polymers were completely compatible within the adhesive system with no indication of phase separation. The adhesives containing the lower levels of the polymer where, however, observed to exhibit poor mechanical strength indicating a preference in the adhesive compositions for a minimum amount of 30% of the acrylic containing polymer.

EXAMPLE III

A series of adhesives were prepared to illustrate the use of high levels of the hydroxyl containing polymer. In particular, in Sample 1, the hydroxyl containing polymer functioned as the polyol and no additional polyol component was utilized. In this testing, the Peel test results are for the values at 45° C.

| Raw Materials | 1 | 2 | 3 |
|---|---|---|---|
| K | 90 | 80 | 70 |
| Polyethylene Glycol | — | 10 | 20 |
| MDI | 10 | 10 | 10 |
| % FREE NCO | 2.5 | 1.9 | 1.8 |
| Viscosity (cps) | 63,900 | 40,100 | 11,800 |
| Peel Rate (mm/min) @ 45° C. | 1 | 4 | 15 |

K: 57 methyl methacrylate/41 butyl acrylate/2 2-hydroxy ethylhexyl acrylate; OH# 12, Mn 7390; Tg 15° C.

EXAMPLE IV

Another sample was prepared as described in Example I using approximately 54% by weight of the hyroxyl containing polymer identified as Sample A. The resulting adhesive was used to bond automotive gaskets to metal plaques. The composites so produced were immersed in heated (300° C.) portions of automotive transmission fluid and motor oil. No bond failure was observed even after 24 hours.

We claim:

1. A solvent-free moisture curable one-part hot melt polyurethane adhesive or sealant composition which is solid at room temperature comprising:

a) 10 to 70% by weight of a urethane prepolymer having an isocyanate content of 0.25 to 15% by weight and an isocyanate index greater than 1 and up to about 3; and b) 30 to 90% by weight of a hydroxyl containing polymer formed from ethylenically unsaturated monomers, said polymer having a number average molecular weight of 4,000 to 15,000 as determined by Gel Permeation Chromatography with a tetrahydrofuran carrier solvent at a flow rate of 1 milliliter per minute, the polymer (b) containing sufficient hydroxyl functionality to provide an OH number of 5 to 15, the hydroxyl functionality being derived from hydroxyl substituted monomers selected from the group consisting of C1 to C12 esters of acrylic and methacrylic acids, vinyl esters, vinyl ethers, fumarates, maleates, styrene, and acrylonitrile, the polymer containing no sulfide functionality.

2. A solvent-free moisture curable one-part hot melt polyurethane adhesive or sealant composition which is solid at room temperature comprising:

a) 10 to 70% by weight of a urethane prepolymer having an isocyanate content of 0.25 to 15% by weight and an isocyanate index greater than 1 and up to about 3; and b) 30 to 90% by weight of a hydroxyl containing polymer formed from ethylenically unsaturated monomers, said polymer having a number average molecular weight of 4,000 to 15,000 as determined by Gel Permeation Chromatography with a tetrahydrofuran carrier solvent at a flow rate of 1 milliliter per minute, the polymer (b) containing sufficient hydroxyl functionality to provide an OH number of 5 to 15, the hydroxyl functionality being derived from hydroxyl substituted methyl acrylate, ethyl acrylate, n-butyl acrylate, 2-ethylhexyl acrylate, isobutyl acrylate, n-propyl acrylate, isopropyl acrylate and the corresponding methacrylates, the polymer containing no sulfide functionality.

3. The hot melt adhesive or sealant of claim 1 wherein the hydroxyl containing polymer has a Tg to −48° to 105° C.

4. The hot melt adhesive or sealant of claim 3 wherein the hydroxyl containing polymer has a Tg to 15° to 85° C.

5. The hot melt adhesive or sealant of claim 1 wherein the hydroxyl containing polymer is combined with the urethane prepolymer.

6. The hot melt adhesive or sealant of claim 1 wherein the hydroxyl containing polymer is incorporated into the urethane prepolymer In the form of the monomeric components which are subsequently polymerized within the urethane prepolymer.

7. The hot melt adhesive or sealant of claim 1 wherein the urethane prepolymer is prepared from the condensation polymerization of a polyol and a polyisocyanate.

8. The hot melt adhesive or sealant of claim 7 wherein the urethane prepolymer is prepared from the condensation polymerization of the hydroxyl containing polymer and a polyisocyanate.

9. The hot melt adhesive or sealant of claim 8 wherein the polyol is selected from the group consisting of polyalkylene ether glycols, polyhydroxy polyalkylene ethers, polyhydroxy polyesters, the ethylene or propylene oxide adducts of polyols and esters of glycerol.

10. The hot melt adhesive or sealant of claim 1 wherein the polyisocyanate in the urethane prepolymer is selected from the group consisting of ethylene diisocyanate; ethylidene diisocyanate; propylene diisocyanate; 3-isocyanatomethyl-3,5,5-trimethylcyclohexyl isocyanate; 3-isocyanatomethyl-3,5,5-trimethylcyclohexyl isocyanate cyanurate; butylene diisocyanate; hexamethylene diisocyanate; toluene diisocyanate; cyclopentylene-1,3,-diisocyanate; cyclohexylene-1,4-diisocyanate; cyclohexylene-1,2-diisocyanate; 4,4'-diphenylmethane diisocyanate; 2,2-diphenylpropane-4,4'-diisocyanate; p-phenylene diisocyanate; m-phenylene diisocyanate; xylylene diisocyanate; 1,4-naphthylene diisocyanate; 1,5-naphthylene diisocyanate; diphenyl-4,4'-diisocyanate; azobenzene-4,4'-diisocyanate; diphenylsulphone-4,4'-diisocyanate; dichlorohexamethylene diisocyanate; furfurylidene diisocyanate; 1-chlorobenzene-2,4-diisocyanate; 4,4',4"-triisocyanatotriphenylmethane; 1,3,5-triisocyanato-benzene; 2,4,6-triisocyanato-toluene; and 4,4'-dimethyldiphenylmethane-2,2',5,5-tetraisocyanate.

11. The hot melt adhesive or sealant of claim 1 wherein the hydroxyl substituted polymer has a number average molecular weight less than 12,000.

* * * * *